United States Patent
Blinov

(10) Patent No.: US 6,928,839 B2
(45) Date of Patent: Aug. 16, 2005

(54) METHOD FOR PRODUCTION OF SILICA OPTICAL FIBER PREFORMS

(75) Inventor: Leonid M. Blinov, Moscow (RU)

(73) Assignee: CeramOptec Industries, Inc., East Longmeadow, MA (US)

(*) Notice: Subject to any disclaimer, the term of this patent is extended or adjusted under 35 U.S.C. 154(b) by 422 days.

(21) Appl. No.: 10/219,745

(22) Filed: Aug. 15, 2002

(65) Prior Publication Data

US 2004/0031288 A1 Feb. 19, 2004

(51) Int. Cl.[7] ............................................ C03B 37/018
(52) U.S. Cl. ...................... 65/391; 427/575; 118/723
(58) Field of Search ................................. 65/391, 436

(56) References Cited

U.S. PATENT DOCUMENTS

| | | | |
|---|---|---|---|
| 4,508,554 A | | 4/1985 | Beerwald et al. |
| 4,776,918 A | * | 10/1988 | Otsubo et al. ......... 156/345.41 |
| 5,597,624 A | * | 1/1997 | Blinov et al. ............... 427/575 |
| 6,138,478 A | * | 10/2000 | Neuberger et al. ............ 65/391 |

FOREIGN PATENT DOCUMENTS

| | | | | |
|---|---|---|---|---|
| EP | 72069 A1 | * | 2/1983 | ......... C03B/37/025 |
| EP | 0094053 B1 | | 5/1983 | |

OTHER PUBLICATIONS

Nazarov et al., "Plasma-Chemical Deposition Of Nitrides Out of Halogenides", 5th International Conference APEIE–2000, p. 21–26.*

* cited by examiner

*Primary Examiner*—Steven P. Griffin
*Assistant Examiner*—Lisa L. Herring
(74) *Attorney, Agent, or Firm*—B J Associates; Bolesh J. Skutnik

(57) ABSTRACT

A device and method is disclosed for manufacturing optical fiber preforms utilizing microwave plasma assisted chemical vapor deposition. Precursor gas is introduced to the face of a vertically mounted dielectric rod, and a plasma is struck by means of simultaneous excitation of an E01 type wave and an H type wave with rotating linear polarization. The silica rod is positioned so that its face is at the bottom of the tube. Precursor gas is delivered from a position below the face of the silica rod, and microwave energy, which travels through the rod to the rod face, is delivered from a source positioned above the rod. With this configuration, a uniformly dense plasma localized on the face of the rod can simultaneously deposit both a pure or doped core and a doped cladding. It is also useful for creating waveguides, preform cores for use as substrates in creating optical fiber preforms, capillaries and ceramic rods.

11 Claims, 2 Drawing Sheets

METHOD FOR PRODUCTION OF SILICA OPTICAL FIBER PREFORMS

BACKGROUND OF THE INVENTION

1. Field of the Invention

The invention relates to the manufacture of optical fiber preforms and preform rods.

2. Information Disclosure Statement

Silica activated lightguides with flourine doped silica ($SiO_2$—F) claddings and cores doped with Al or Ge and/or Rare earth elements (Neodymium, Erbium, Holmium, Ytterbium, Europium and so on) are widely used for the creation of optical fiber amplifiers, lasers and sensors of different types. In UV fibers, however, the presence of Germanium can result in ultraviolet radiation-induced color centers, which are point defects in the core's silica that generate absorption bands in the UV and visible spectrum that deteriorate the optical fiber transmission in that spectral region. Lightguides containing an SiON core and $SiO_2$—F cladding would be useful for ultraviolet applications because of the absence of Germanium in the lightguide core. SiON cores are useful in that they provide the ability to easily change the refractive index during manufacture within a 1.5–2.0 range by modifying the ratio of $O_2$ to $N_2$ in the glass matrix. This enables modification of the numerical aperture of $SiO_2$/SiON and $SiO_2$—F/SiON lightguides within a wide range. Furthermore, lightguides with SiON cores have a high radiation resistance. It would be extremely useful to have a method for production of such lightguides.

Presently, the most popular methods for manufacturing optical fiber preforms are Modified Chemical Vapor Deposition (MCVD), Outside Vapor Deposition (OVD), Vapor Axial Deposition (VAD), Plasma Enhanced CVD (PCVD), and Surface Plasma CVD (SPCVD).

The main disadvantage of MCVD, OVD, and VAD technologies for manufacturing preforms with active cores is that these methods require a step during the deposition in which soot glass layers are formed. The presence of soot makes it difficult to fabricate cores or claddings with steep doping profiles. Another disadvantage of these methods is the difficulty of achieving homogeneous doping, especially for lightguides with high rare earth element (REE) concentrations. Both the ability to deposit glass directly from the gas phase without a soot-forming stage and the ability to reduce the length of the active part of optical fiber lasers and amplifiers at high REE concentrations are the main advantages of deposition with a microwave plasma at low pressure. Additionally, only low pressure microwave plasma techniques have been able to provide effective $N_2$-dissociation (when the electron temperature is essentially higher than gaseous one, or when $T_e >> T_g$) because of the high bond energy of $N_2$. Despite the advantages of plasma-chemical technologies in optical fiber preform production, effective tubeless microwave plasma-chemical technologies for the production of optical fiber preforms, including for example, activated and $N_2$-doped preforms, have not been developed before the present time.

Methods for manufacturing dielectric rods by low pressure microwave plasma deposition are known. One such method is described in European Patent No. 0094053B1 by Beerwald et al. This method is also described in U.S. Pat. No. 4,508,554 by Beerwald et al, which is in the same family as European Patent No. 0094053B1. However, this method possesses three major drawbacks.

The first major disadvantage of the Beerwald patent is its inability to produce uniform microwave power density both in the microwave discharge and on the rod face using only either an $E_{011}$ excitation mode or a circularly polarized H excitation mode. This results in a nonuniform deposition of doped silica glass on the rod face. Beerwald also provides for rotation of the rod, but rotating the rod is insufficient to fully compensate for the nonuniform deposition.

The second major disadvantage is that the Beerwald invention is capable of delivering only relatively low microwave power densities on the rod face when the disclosed operating parameters are implemented. For example, only 50–60 W/cm$^2$ was achieved at the rod face when deposition on a described 60 mm diameter rod was attempted using the described 2 kW generator power under an operating gas pressure of 1 torr. The result of this low power density is a relatively low silica glass deposition rate (0.1–0.2 g/min) because the $E_{011}$ resonator used by Beerwald is ineffective (it has low Q-quality in case of microwave plasma ignition).

The third major disadvantage is the Beerwald invention's inability to simultaneously provide both a temperature as high as 1200° C. and a high uniform power density (220–250 W/cm2). A high temperature is needed for effective removal of $Cl_2$ from the deposited glass, and high uniform power density is required to produce a high deposition rate and effective dissociation and ionization of reagents at the rod face and in the microwave discharge. This invention is unable to perform these functions using only a single channel for the control and transmission of continuous microwave energy and thus one excitation mode.

An additional drawback to the Beerwald invention arises from the configuration of the described device. According to Beerwald, precursor gas is introduced above the substrate rod face. This configuration could lead to potential impurities or nonuniformities in the resultant deposition. Because the gravitational force tends to pull introduced gas particles toward the face of the substrate rod, the potential exists for unwanted particles, such as sootlike particles including Si, $SiO_2$ and SiO, to drop onto the face of the substrate rod and reduce the purity of the preform produced. Additionally, the additional gravitational force on molecules created in the plasma can reduce control over the deposition of the molecules, and result in less effective control over the thickness of the deposition.

OBJECTIVES AND BRIEF SUMMARY OF THE INVENTION

It is an object of the present invention to provide a method and device for the efficient production of optical fiber preforms and preform rods.

It is another object of the present invention to provide an effective device and method for the manufacture in one process of both claddings and cores of optical fiber preforms.

It is yet another object of the present invention to provide an effective device and method for production of preforms with a flourine-doped silica cladding and a core doped by Aluminum, Germanium or Rare Earth Elements.

It is still another object of the present invention to provide an effective device and method for production of preforms with SiON cores that are useful for ultraviolet wave applications.

Briefly stated, the present invention provides a device and method for manufacturing optical fiber preforms utilizing microwave plasma assisted chemical vapor deposition. Precursor gas is introduced to the face of a vertically mounted dielectric rod, and a plasma is created by means of simultaneous excitation of an $E_{01}$ type wave and an H type wave with rotating linear polarization. The silica rod is positioned so that its face is at the bottom of the tube. Precursor gas is delivered from a position below the face of the silica rod, and microwave energy, which travels through the rod to the rod face, is delivered from a source positioned above the rod. With this configuration, a uniformly dense plasma localized on the face of the rod can deposit both a pure or doped core and a doped cladding simultaneously or in a single process. It is also useful for creating waveguides, preform cores for use as substrates in creating optical fiber preforms, capillaries, and planar waveguides and semiconductor structures. Other materials such as diamond and ceramic materials can be used in this invention.

The above, and other objects, features and advantages of the present invention will become apparent from the following description read in conjunction with the accompanying drawings, (in which like reference numbers in different drawings designate the same elements.)

DETAILED DESCRIPTION OF PREFERRED EMBODIMENTS

Figure 1:
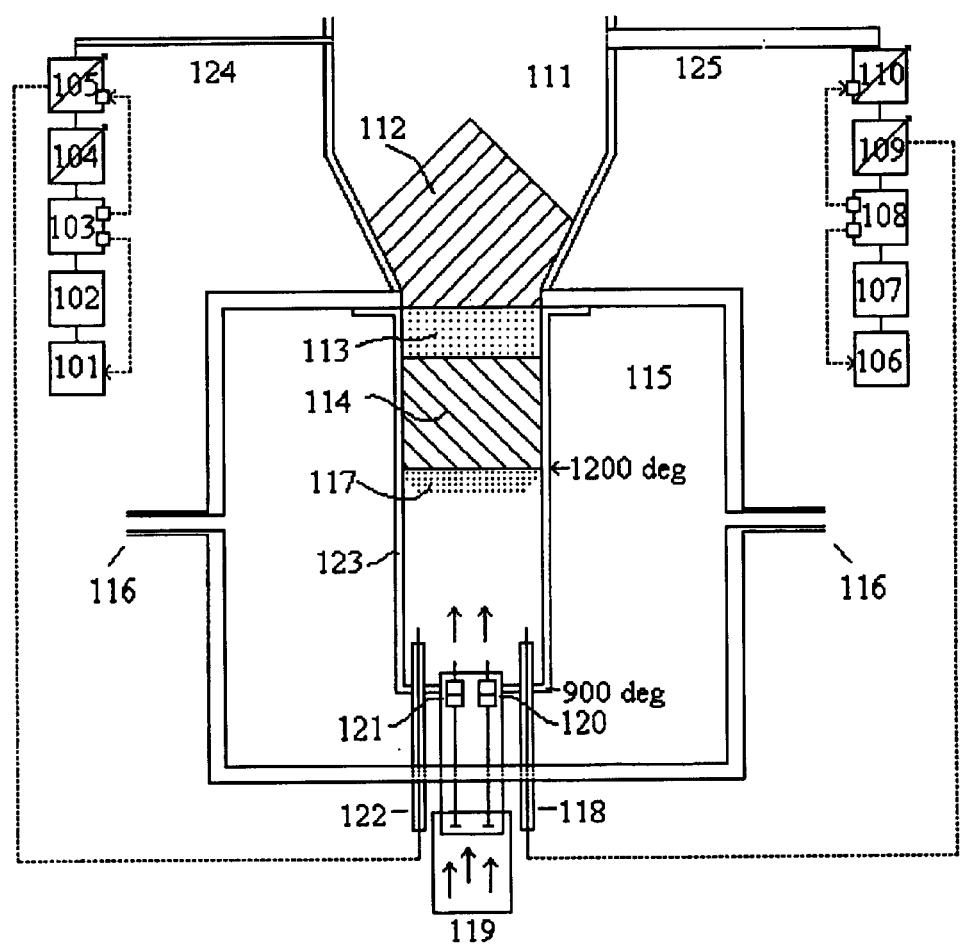
FIG. 1—A diagram of a preferred embodiment, as seen from a plane perpendicular to the rod face.

The main aim of the present invention is to create an effective method for the production of activated optical fiber preforms. This invention is particularly suited for preforms with $SiO_2$—F claddings and cores doped with elements such as Al or Ge, or rare earth elements (REE) such as Nd, Er, Ho, Yb, and Eu. The present invention also addresses the need for SiON core lightguides by providing an effective method for manufacturing preforms with SiON cores and $SiO_2$ or $SiO_2$—F claddings, which are useful for ultraviolet applications. The above core and cladding materials are preferred, though are not the only materials available for use with this invention. Other doping materials and optically transmissive materials can be used. This method can also be used for manufacturing doped or undoped silica rods for use as optical fiber preform cores, which can then be used as substrates for the creation of preforms by depositing claddings by any known method. The method can also be used for the production of silica rods and preforms with other compositions and also for the fabrication of ceramic rods.

In addition, the present invention is useful for creating optical structure planar waveguides and semiconductor structures, and also for the deposition of diamond and other films on planar quartz substrates or other substrates that can be placed on the surface of the rod face.

The present invention utilizes the simultaneous excitation of an $E_{01}$-wave type and an H wave type with rotating linear polarization. This excitation in conjunction with the introduction of specific gases creates a microwave plasma at a low pressure characterized by a homogeneous microwave power density that is preferably about 220–250 W/cm$^2$.

The present invention possesses a number of significant features absent in the prior art which make the disclosed device and process superior and able to produce preforms with larger diameters and of higher quality with a minimum of microwave power and precursor gas consumption.

The first significant difference between the present invention and the prior art relates to the simultaneous use of $E_{01}$ mode waves and H mode waves with rotating linear polarization. The Beerwald patent teaches the use of a single radiation source to strike a plasma, consisting of either $E_{01}$ mode waves or rotationally polarized H mode waves. Either mode alone cannot maintain sufficiently uniform microwave power density in both the plasma discharge and the rod face, and thus cannot produce preforms of a sufficiently high quality. The present invention prescribes the simultaneous application and coupling of $E_{01}$ mode waves and rotationally polarized H mode waves from two independent power sources. This configuration results in a significantly greater uniformity in the microwave power density, and thus produces preform rods of superior quality.

Another difference is in the configuration of the microwave energy source and the gas source in relation to the deposition surface. The Beerwald patent provides for a cylindrical silica starter disc upon which the preform rod is deposited. Microwave energy enters from below the disk along its central cylindrical axis, forming a plasma at the disk face with process gas entering the tube from above the disk face. Prior convention, especially as described in Beerwald, indicates that plasma deposition should take place above the substrate. It has been found, contrary to prior art teachings, that reversing this configuration is beneficial to the deposition process. The present invention does just this, introducing gas below the rod face (i.e. where the rod face, based on gravitational direction, lies above the gas phasing zone), and then depositing and growing the preform in a downward direction. This configuration is capable of producing preforms of higher quality by reducing impurities. The present configuration reduces impurities by eliminating the possibility of particles, such as sootlike Silicon particles, dropping onto the preform face which can occur with the Beerwald configuration. Additionally, because the present invention, in a preferred embodiment, can simultaneously deposit a preform core and cladding, this configuration allows for greater control over the position of precursor gas molecules, and thus helps prevent cross-contamination between core precursor gas and cladding precursor gas.

A preferred embodiment, illustrated in FIG. 1, consists of the following components:

a. pulsed microwave generator 101 to emit pulsed $E_{01}$ microwaves with a preferred 2450 MHz frequency, b. ferrite circulator 102 connected to generator 101 to protect generator 101 from reflected microwave power, c. directional coupler 103 connected to generator 101 for measuring the incident and reflected microwave power, d. attenuator 104 to smoothly regulate the microwave power emitted by generator 101, e. phase rotator 105 connected to generator 101 to maintain the microwave plasma position in the area of maximum electric field, f. continuous microwave generator 106 which excites continuous $H_{11}$ microwaves, g. ferrite circulator 107, directional coupler 108, attenuator 109 and phase rotator 110 connected to generator 101 which fulfill the same above-mentioned functions as 102, 103 and 105, h. circular metal waveguide 111, i. silica conical waveguide 112 to couple $E_{01}$ and $H_{11}$ waves, j. rotating silica rod 113 to rotate the linear polarization of $H_{11}$ wave (The silica glass deposition process is carried out on the face of rod 113), k. tube 123, l. vacuum chamber 115 with connecting pipes 116 for vacuum pumping, m. gas supplying system 119, n. silica inputs of Al and Er vapors 120 and 121, o. preform 114 grown by vapor deposition according to the present invention,
p. microwave discharge 117, temperature sensor 118, and microwave plasma shift (height) sensor 122.
q. rectangular waveguides 124 and 125

In the preferred embodiment represented in FIG. 1, pulsed microwave generator 101 excites a pulsed $E_{01}$ wave with a preferred frequency of 2,450 MHz and preferred power of about 7.5 kW. The $E_{01}$ wave is emitted in pulses with a duration of preferably 1 ms and the pulse frequency is in the preferred range of 10–200 Hz. The $E_{01}$ wave is delivered to circular waveguide 111 via $H_{10}$ mode rectangular waveguide 124. Circular waveguide 111 has a preferred diameter of 120 mm. The broad wall of $H_{10}$ mode rectangular waveguide 124 of generator 101 is perpendicular to the axis of circular waveguide 111.

Simultaneously, continuous microwave generator 106 delivers a continuous $H_{11}$ wave, with power preferably in the range of 0–5 kW, to circular waveguide 111 via rectangular waveguide 125. The broad wall of rectangular waveguide 125 is parallel to the central axis of circular waveguide 111.

Windows for input of microwaves into waveguide 111 are covered by metal conductors (plates and wires) to remove cross wave influence and to prevent leakage of microwave energy from circular waveguide 111. The two microwave energy inputs are thus located in one plane. However, "parasite" $H_{11}$ wave, which arises under $E_{01}$ wave excitation, doesn't penetrate in the highway of the continuous generator 106 because polarization plane of "parasite" $H_{11}$ wave is perpendicular to polarization plane of specially excited continuous $H_{11}$ wave. When exciting $H_{11}$ wave in the circular waveguide from two orthogonal energy inputs we have polarization (when $E_1 \perp E_1$.) which is introduced through conical rod 112, which is filled in by a dielectric such as quartz, into silica rod 113 (60 mm) acting as a waveguide. In this embodiment, silica rod 113 rotates and thus rotates the linear polarization of the $H_{11}$ wave. In order to couple $E_{01}$ and $H_{11}$ waves in circular waveguide 111 to silica rod 113, which itself acts as a waveguide in delivering radiation to the rod face, conical waveguide 112 is used. The conical shape minimizes reflection losses as the waves propagate through the interface of waveguide 111, which has a diameter of 120 mm, and waveguide 112. Silica glass deposition for formation of preform rod 114 is carried out on the face of rod 113.

The combined radiation then enters tube 123, which is kept at a preferred operating gas pressure of 8–25 torr, through rotating rod 113. The temperature at the face of rod 113 (located in a plane perpendicular to the cylindrical axis of rod 113 and tube 123) is preferably 1200° C. This setup and method for maintaining the microwave plasma results in a uniform and stable plasma at the rod face.

Each of the two power sources serve different purposes in sustaining the plasma and maintaining a high efficiency. The high pulsed microwave power emitted by generator 101 produces a high degree of gas ionization at relatively low plasma temperatures, and the presence of continuous waves produced by generator 106 heats plasma electrons during pauses between impulses and thus increases the time required for plasma deionization. Because of this combination of pulsed and continuous radiation, more energy can be introduced into the plasma without raising the temperature unacceptably high, and thus a greater percentage of the precursor gas can be excited resulting in greater efficiency. The increase in deionization time by electron heating results because of a rapid decrease in the recombination coefficient of charged particles when the electron temperature increases. The transfer of the microwave energy to electrons leads to excitation, dissociation and ionization of gas molecules through inelastic collisions between electrons and gas molecules. In all cases, the number of collisions per unit time and unit volume increases as the gas pressure and electron concentration $N_e$ ($N_e=10^{13}-10^{14}$ 1/cm$^3$ during pulsed microwave discharge, whereas $N_e<10^{12}$ 1/cm$^3$ during continuous microwave discharge) increases. Additionally, the operating gas mixtures can be diluted by a small quantity of argon to increase the degree of ionization and the volume (ie. height) of the microwave discharge. Argon is preferred because it is easily ionized. Microwave plasma energy is used to heat the rod face to a desired 1200° C., and heat tube 123 (ceramics or metal foil stabled to the heating) and microwave dielectric (silica tangent of dielectric losses tg increases when the temperature at the rod face achieves 900–1000 C.).

A stabilization system is used to regulate the microwave power emitted by each source in order to maintain a constant rod face temperature and microwave power density. This system consists of the following units:
1. Unit of automatic regulation and control of the microwave power produced by each generator.
2. Directional couplers to measure the incident and reflected microwave power.
3. Unit to display (indication unit) incident and reflected microwave power values.
4. The sensors of microwave plasma shift (or height) and temperature together with electrically controlled phase rotators and attenuators in each channel.

Both generators 101 and 106 are protected respectively by ferrite circulators 102 and 107 from reflected microwave energy. Generators 101 and 106 are also connected to directional couplers 103 and 108 to measure the incident and reflected microwave power, which are in turn connected to attenuators 104 and 109 to smoothly regulate modifications of microwave power. Generators 101 and 106 are also connected to phase rotators 105 and 110 to maintain the position of the microwave plasma within the region of optimal electric field strength. Phase rotators 105 and 110 maintain plasma position by reacting to readings from sensor 122 that detects shifts in the position of the plasma. The temperature of the plasma is measured by temperature sensor 118, which is connected to attenuator 109. Attenuator 109 responds to temperature readings and regulates the power output from 106. In this way, a constant temperature is maintained in the plasma.

A pressure stabilization system is applied in the plasmachemical reaction zone for the maintenance of a constant operating gas pressure. The operating gas dosage system provides a supply of the necessary quantity of chemical reagents in designed concentration to every point of the surface of the rotating rod face.

The present invention is further illustrated by the following examples, but is not limited thereby.

EXAMPLE 1
Production of a Silica Optical Fiber Preform with a $SiO_2$—F Cladding and a SiON Core Argon gas is first introduced into tube 123, generating a pressure of 1 torr in tube 123. Microwave plasma 126 is ignited on the face of rod 113 with radiation from pulsed generator 101, which delivers 7.5 kW of power in 1 ms pulses at a 100 Hz repetition rate. The pressure is then increased to 3–5 torr and microwave power delivered by continuous generator 106 is smoothly increased to 0.5 kW by attenuator 109. This process acts to clean the face of rod 113.

In the next step, argon is partially removed and oxygen is introduced. The pressure is raised up to 10–15 torr and the power delivered by generator 106 increases the temperature of the plasma, and thus the temperature of the rod face, as high as 1200° C. Gas mixtures for the formation of both an $SiO_2$—F cladding and an SiON core are simultaneously introduced into tube 123 through special precursor gas inputs 120 and 121. In a preferred embodiment, a mixture of $O_2+SiCl_4+C_3F_8+Ar$ is used for the $SiO_2$—F cladding deposition and a mixture of $SiCl_4+O_2+N_2+Ar$ is used for the SiON core deposition. It is to be noted that the $N_2+O_2$ flow is always more than twice the $SiCl_4$ flow (by $N_2$) in the core deposition area and core deposition precursor gas mixture.

An example of detailed process parameters for this method of producing silica optical fiber preforms with $SiO_2$—F reflecting cladding and SiON core is as follows.

| | |
|---|---|
| Microwave power (impulse), $E_{01}$ wave, kW | 7.5 |
| Impulse duration, ms | 1.0 |
| Impulse repetition rates, Hz | 100 |
| Microwave power (continuous), $H_{11}$ wave with rotating polarization, kW | 0–4.5 |
| Operating gas pressure, torr | 12 |
| Mutual operating gas flow, $cm^3/min$ | 9200 |
| $N_2$ flow for core formation, $cm^3/min$ | 1500 |
| $SiCl_4$ flow (by $N_2$) for core formation, $cm^3/min$ | 800 |
| $O_2$ flow for core formation, $cm^3/min$ | 350 |
| Ar flow for core formation, $cm^3/min$ | 100 |
| $O_2$ flow for cladding formation, $cm^3/min$ | 5000 |
| $SiCl_4$ flow for cladding formation, $cm^3/min$ | 1250 |
| $C_3F_8$ flow for cladding formation, $cm^3/min$ | 100 |
| Ar flow for cladding formation, $cm^3/min$ | 100 |
| Silica rod diameter, mm | 60 |
| Rod face temperature, C. | 1200 |
| Rate of rod rotation, rev/min | 100 |

The deposition rate of the SiO2—F/SiON preform is 2.5 g/min. A preform with a 60 mm diameter, a 210 mm length, and a weight of over 2 kg is fabricated by deposition in 14 hours.

EXAMPLE 2
Production of a Preform with Cladding and Al and Er Doped Core

With the present invention, a preform can be manufactured that features a core whose refractive index is radially variable. The produced reflective cladding consists of fluorine-doped silica and the core consists of silica doped with aluminum and erbium. A gas mixture consisting of $O_2+SiCl_4+C_3F_8+ErCl_3$(waterless vapor)$+AlCl_3$(waterless vapor) is supplied to the microwave plasma zone via gas supply system 119. $AlCl_3$ and $ErCl_3$ vapors are supplied to the plasma from the closed silica containers 120 and 121, (with $ErCl_3$ and $AlCl_3$ powders) which are located under the microwave plasma at the 900° C. temperature zone in the graphite tube 123. Condensation of $ErCl_3$ and $AlCl_3$ in the reaction zone during vapor transportation is avoided because the temperature increases around the supplying vapors in the plasma zone. The activator flow is determined by pressure difference of $ErCl_3$ and $AlCl_3$ saturated vapors into containers 120 and 121 and the pressure in the graphite tube and also by resistance of capillaries connecting these two volumes.

The doping level is modified by changing the temperature of containers 120 and 121. The temperature of these containers can be changed by changing the container positions with respect to the microwave plasma. The containers are removed from high temperature zone to completely stop supplying $ErCl_3$ and $AlCl_3$ vapors to the plasma. In this case saturated vapor pressure decreases and the $ErCl_3$, $AlCl_3$ vapor supply ceases.

Simultaneous preform core doping with Er and Al by this method can be used for the production of the active part of optical fiber lasers and amplifiers.

The present invention provides the ability to produce preforms with a wide variety of diameters. For example, a preform with a diameter between 25–30 mm and 80 mm using a 2450 MHz generator frequency and waveguide 111 diameter of 120 mm. To produce preforms in this diameter range, the dielectric permeability of conical waveguide 112 is between 2–2.5 (polystirol, flouroplast) to 20–25 (special ceramic). The deposition rate of doped silica glass can be achieved up to 2.5–3 g/min.

Suggested detailed process parameters for this method for manufacturing a silica activated optical fiber preform with $SiO_2$—F reflecting cladding and core doped by Er and Al are as follows.

| | |
|---|---|
| Microwave power (impulse), $E_{01}$ wave, kW | 7.5 |
| Impulse duration, ms | 1.0 |
| Impulse repetition rates, Hz | 100 |
| Microwave power (continuous), $H_{11}$ wave with rotating polarization, kW | 0–4.5 |
| Operating gas pressure, torr | 12 |
| Mutual gas flow, $cm^3/min$ | 9500 |
| $O_2$ flow for cladding formation, $cm^3/min$ | 6000 |
| $SiCl_4$ flow for cladding formation, $cm^3/min$ | 1300 |
| $C_3F_8$ flow for cladding formation, $cm^3/min$ | 100 |
| Ar flow for cladding formation, $cm^3/min$ | 100 |
| $O_2$ flow for core formation, $cm^3/min$ | 1500 |
| $SiCl_4$ flow for core formation, $cm^3/min$ | 300 |
| $AlCl_3$ flow for core formation, $cm^3/min$ | 50 |
| $ErCl_3$ flow for core formation, $cm^3/min$ | 50 |
| Ar flow for core formation, $cm^3/min$ | 100 |
| Silica container (with $AlCl_3$, $ErCl_3$) temperature, C. | 900 |
| Silica rod diameter, mm | 60 |
| Rod face temperature, C. | 1200 |
| Rate of rod rotation, rev/min | 100 |

The deposition rate of doping silica glass (cladding and core) is 2.5 g/min. The preform (60 mm diameter, 210 mm length, more than 2 kg weight) for activated lightguides is produced after 14 hours of continuous deposition.

EXAMPLE 3
Preform Manufacture without Pulsed Generator 106

Figure 2:
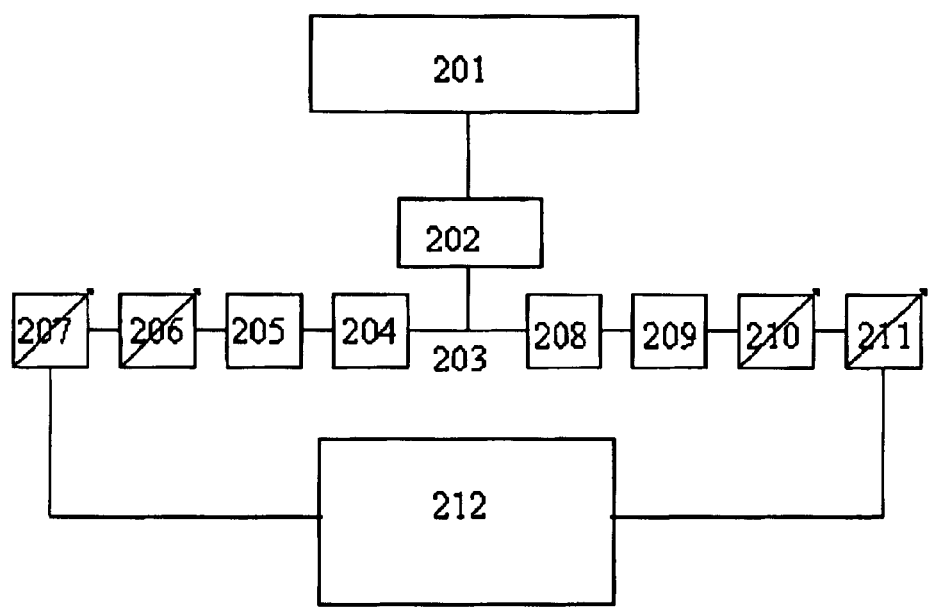
FIG. 2—A schematic of a preferred embodiment utilizing only one microwave generator.

This alternative embodiment of the present invention presents a simpler device scheme for manufacturing activated optical fiber preforms, SiON core preforms, $SiO_2$ rods doped by nitrogen and $SiO_2$ rods doped by Al (Ge) and different types of REE (Er and so on). In this case the microwave power density on the rod face and in the microwave plasma will be lower (150–160 $W/cm^2$) then in those embodiments that include a pulsed microwave generator. The deposition rate is approximately 1–1.5 g/min in this case. A diagram of this installation is shown in FIG. 2.

Continuous microwave generator 201 emits radiation at preferably 2450 MHz and 6 kW through ferrite circulator 202, which "protects" generator 201 from reflected microwave power, to power divider 203 which divides this power into two equal parts for 2 microwave energy channels which are divided by the ferrite circulators 204 and 208. The excitation process of $E_{01}$ and $H_{11}$ wave with revolving polarization is performed by the same manner and consistency as in the previous embodiments (FIG. 1). $E_{01}$ and $H_{11}$ waves with 1 kW power are excited by attenuators 206 and

210. The microwave discharge is then ignited by argon and the rod face is cleaned. Next, argon is partially substituted by oxygen. The operating pressure increases up to 6–10 torr and the microwave power of $E_{01}$ wave smoothly increases up to 2–2.5 kW. To provide the 1200 C. microwave plasma temperature the power of $H_{11}$ wave should be increased to the proper corresponding value by attenuator 210. The remaining stages of the process are completed as described in previous embodiments. Phase rotators 207 and 211 have the same functions as in previous embodiments. Directional couplers 205 and 209 serve to control incident and reflected microwave power. The remaining components of the device, including the circular waveguide, conical waveguide, tube, rotating rod, vacuum chamber and gas supply systems are represented by 212.

Examples of technological process parameters for manufacturing of activated optical fiber preforms and SiON core preforms are given below. Technological regimes of production of different silica rods for optical fiber preforms (fabricated by installations presented on FIGS. 1, 2) are also given. These examples are not exhaustive, and in no way limit the present invention.

The remaining examples list possible operation parameters for the manufacture of different preform types.

EXAMPLE 4

The Method for Production of an SiON Rod for Use in Subsequent Manufacture of an Optical Fiber Preform

| | |
|---|---|
| Microwave power (impulse), $E_{01}$ wave, kW | 7.5 |
| Impulse duration, ms | 1.0 |
| Impulse repetition rates, Hz | 100 |
| Microwave power (continuous), $H_{11}$ wave with rotating polarization, kW | 0–4.5 |
| Gas pressure, torr | 15 |
| Mutual gas flow, cm$^3$/min | 12000 |
| $N_2$ flow, cm$^3$/min | 6500 |
| $O_2$ flow, cm$^3$/min | 1500 |
| $SiCl_4$ flow, cm$^3$/min | 3800 |
| Ar flow, cm$^3$/min | 200 |
| Silica rod diameter, mm | 60 |
| Rod face temperature, C. | 1200 |
| Rate of rod rotation, rev/min | 100 |

The deposition rate of SiON glass is 3 g/min. SiON rod (60 mm diameter, 210 mm length, more than 2 kg weight) is fabricated for 12 hours of continuous deposition process.

EXAMPLE 5

The Method for Production of an $SiO_2$—$GeO_2$ Rod

| | |
|---|---|
| Microwave power (continuous), $E_{01}$ wave, kW | 0–2.5 |
| Microwave power (continuous), $H_{11}$ wave | 0–2.5 |
| Operating gas pressure, torr | 8 |
| Mutual gas flow, cm$^3$/min | 6320 |
| $O_2$ flow, cm$^3$/min | 4800 |
| $SiCl_4$ flow, cm$^3$/min | 1200 |
| $GeCl_4$ flow, cm$^3$/min | 120 |
| Ar flow, cm$^3$/min | 200 |
| Silica rod diameter, mm | 60 |
| Rod face temperature, C. | 1000 |
| Rate of rod rotation, rev/min | 100 |

The deposition rate of glass is 1.4 g/min.

EXAMPLE 6

The Method for Manufacturing of Silica Rod (Particular Purity)

| | |
|---|---|
| Microwave power (continuous), $E_{01}$ wave, kW | 0–2.5 |
| Microwave power (continuous), $H_{11}$ wave with rotating polarization, kW | 0–2.5 |
| Operating gas pressure, torr | 8 |
| Mutual gas flow, cm$^3$/min | 6750 |
| $SiCl_4$ flow, cm$^3$/min | 1300 |
| $O_2$ flow, cm$^3$/min | 5250 |
| Ar flow for cladding formation, cm$^3$/min | 200 |
| Silica rod diameter, mm | 60 |
| Rod face temperature, C. | 1200 |
| Rate of rod rotation, rev/min | 100 |

The deposition rate of glass is 1.4 g/min.

EXAMPLE 7

The Method for Production of Silica Rod Doped by Al and Er

| | |
|---|---|
| Microwave power (continuous), $E_{01}$ wave, kW | 0–2.5 |
| Microwave power (continuous), $H_{11}$ wave with rotating polarization, kW | 0–2.5 |
| Operating gas pressure, torr | 8 |
| Mutual gas flow, cm$^3$/min | 6100 |
| $O_2$ flow, cm$^3$/min | 4600 |
| $SiCl_4$ flow, cm$^3$/min | 1100 |
| $AlCl_3$ flow, cm$^3$/min | 100 |
| $ErCl_3$ flow, cm$^3$/min | 100 |
| Ar flow, cm$^3$/min | 200 |
| Silica rod diameter, mm | 60 |
| Rod face temperature, C. | 1200 |
| Rate of rod rotation, rev/min | 100 |

The deposition rate of doped silica glass is 1.2 g/min.

Having described preferred embodiments of the invention with reference to the accompanying drawings, it is to be understood that the invention is not limited to the precise embodiments, and that various changes and modifications may be effected therein by those skilled in the art without departing from the scope or spirit of the invention as defined in the appended claims.

What is claimed is:

1. A method of manufacturing silica optical fiber preforms by plasma deposition comprising the following steps:

positioning a rotating cylindrical dielectric starter rod coaxially within a vertically positioned cylindrical tube, wherein a diameter of said starter rod is equal to an inside diameter of said tube;

introducing a precursor gas mixture into a cavity within said tube;

simultaneously applying microwaves from independent sources through a single waveguide, wherein a first source emits rotationally symmetric microwaves, and a second source emits rotationally non-symmetrical microwaves with rotating linear polarization.

depositing a fiber preform core and a fiber preform cladding on a face of said starter rod.

2. A method of manufacturing silica optical fiber preforms according to claim 1, wherein said waveguide is positioned above said starter rod and said microwaves propagate through said starter rod to said face; wherein further said precursor gas mixture is introduced from a position below said face.

3. A method of manufacturing silica optical fiber preforms according to claim 1, wherein said rotationally symmetric microwaves are in an $E_{01}$ mode.

4. A method of manufacturing silica optical fiber preforms according to claim 1, wherein said rotationally non-symmetrical microwaves are in a $H_{11}$ mode.

5. A method of manufacturing silica optical fiber preforms according to claim 1, wherein said rotating starter rod produces rotating linear polarization in said rotationally non-symmetrical microwaves.

6. A method of manufacturing silica optical fiber preforms according to claim 1, wherein said first source emits pulsed microwaves, and wherein said second source emits continuous microwaves.

7. A method of manufacturing silica optical fiber preforms according to claim 1, wherein said preform core and said fiber preform cladding are deposited simultaneously.

8. A method of manufacturing silica optical fiber preforms according to claim 1, wherein said fiber preform cladding is selected from a group consisting of fluorine-doped $SiO_2$ and pure $SiO_2$.

9. A method of manufacturing silica optical fiber preforms according to claim 1, wherein said fiber preform core is selected from a group consisting of SiON, $SiO_2$ doped with Al, $SiO_2$ doped with Al and a rare earth element, $SiO_2$ doped with Ge, and $SiO_2$ doped with Ge and a rare earth element.

10. A method of manufacturing silica optical fiber preforms according to claim 1, wherein said precursor gas mixture includes doping elements for doping said core.

11. A method of manufacturing silica optical fiber preforms according to claim 1, wherein a flat silica plate is mounted on said rod face prior to deposition for the formation of a planar lightguide.

* * * * *